United States Patent
Deardorff et al.

(10) Patent No.: US 7,889,888 B2
(45) Date of Patent: Feb. 15, 2011

(54) SYSTEM AND METHOD FOR GROUPING AND VISUALIZING DATA

(75) Inventors: Thomas P. Deardorff, Spring Mills, PA (US); Christopher R. Harm, State College, PA (US); John D. Hennessy, Pleasant Gap, PA (US); Daniel P. Truitt, Port Matilda, PA (US); Jonathon P. Smith, Port Matilda, PA (US)

(73) Assignee: Raytheon Company, Waltham, MA (US)

( * ) Notice: Subject to any disclaimer, the term of this patent is extended or adjusted under 35 U.S.C. 154(b) by 902 days.

(21) Appl. No.: 11/769,574

(22) Filed: Jun. 27, 2007

(65) Prior Publication Data
US 2009/0003657 A1 Jan. 1, 2009

(51) Int. Cl.
*G06K 9/00* (2006.01)
*G08G 1/123* (2006.01)
*G01C 21/30* (2006.01)

(52) U.S. Cl. .................. 382/113; 701/120; 701/208; 382/298; 340/995.1

(58) Field of Classification Search ............... 382/113, 382/173, 178, 180, 224, 225, 284, 298, 312; 345/632, 660, 635; 701/55, 200, 208, 209, 701/210; 340/990, 995, 1, 995.11–995.19; 358/1.2
See application file for complete search history.

(56) References Cited

U.S. PATENT DOCUMENTS

| | | | |
|---|---|---|---|
| 5,553,209 A * | 9/1996 | Johnson et al. | 345/667 |
| 6,243,094 B1 | 6/2001 | Sklar | 345/356 |
| 6,904,361 B1 | 6/2005 | Tallman et al. | |
| 6,920,391 B2 * | 7/2005 | Daubert et al. | 701/200 |
| 6,995,778 B2 * | 2/2006 | Noble et al. | 345/632 |
| 2001/0027375 A1 | 10/2001 | Machida et al. | |
| 2002/0130906 A1 | 9/2002 | Miyaki | 345/837 |
| 2004/0236730 A1 | 11/2004 | Frank | |
| 2004/0243307 A1 | 12/2004 | Geelen | 701/213 |
| 2005/0182765 A1 | 8/2005 | Liddy | |
| 2006/0190493 A1 | 8/2006 | Kawai et al. | |
| 2006/0258365 A1 | 11/2006 | Cha et al. | |

(Continued)

FOREIGN PATENT DOCUMENTS

WO       WO 95/20799       8/1995

(Continued)

OTHER PUBLICATIONS

PCT/US2008/67957, PCT Notification of Transmittal of The International Search Report and The Written Opinion of the International Searching Authority, or the Declaration, 7 pages, Date Mailed Sep. 4, 2009.

(Continued)

*Primary Examiner*—Kanji Patel
(74) *Attorney, Agent, or Firm*—Baker Botts L.L.P.

(57) ABSTRACT

A method for visualizing data comprises allocating the data to one or more groups. The method further comprises displaying one or more non-overlapping symbols on a map to represent the groups. The method further comprises merging the non-overlapping symbols into a lesser number of non-overlapping symbols when the map is zoomed out. The method also comprises splitting the one or more non-overlapping symbols into a greater number of non-overlapping symbols when the map is zoomed in.

20 Claims, 6 Drawing Sheets

U.S. PATENT DOCUMENTS

2007/0050324 A1  3/2007  Trinkel et al.
2007/0143495 A1  6/2007  Porat

FOREIGN PATENT DOCUMENTS

WO   WO 2005/092072 A2   10/2005

OTHER PUBLICATIONS

PCT Notification of Transmittal of the International Search Report and the Written Opinion of the International Searching Authority, or the Declaration, mailed Sep. 29, 2008, with regard to PCT/US2008/067960 filed Jun. 24, 2008 (12 pages), Sep. 29, 2008.

Deardorff et al., U.S. Appl. No. 11/769,550 filed Jun. 27, 2007, *System and Method for Analyzing Intelligence Information*, Jun. 27, 2007.

Deardorff et al, U.S. Appl. No. 11/769,563 filed Jun. 27, 2007, *System and Method for Displaying Geographical Information*, Jun. 27, 2007.

PCT/US2008/067958, PCT Notification of Transmittal of The International Search Report and The Written Opinion of the International Searching Authority, or the Declaration, 12 pages, Date Mailed Feb. 17, 2009.

* cited by examiner

SYSTEM AND METHOD FOR GROUPING AND VISUALIZING DATA

TECHNICAL FIELD

This disclosure relates in general to computer systems, and more particularly to a method for grouping and visualizing geographic data.

BACKGROUND

Intelligence analysts employ a variety of software tools to quickly and accurately analyze information that they receive. Analysts may receive frequent and numerous messages from a variety of sources into message boxes for which they are responsible. Analysts must review these messages to extract important intelligence information, and it can also be useful to retrieve information from other sources relating to the content of the message. Existing systems can display incoming messages to an analyst and provide the analyst with access to additional information.

Analysts may also need to view location-specific data on a map or a series of maps. In addition, they may have a need to see the data in a specific manner depending on the type of map, the resolution of the map, and/or the locations depicted on the map. Existing systems have difficulties dynamically updating a display with information that the analyst wants to view on the map.

SUMMARY OF EXAMPLE EMBODIMENTS

In accordance with one embodiment of the present disclosure, a method for visualizing data comprises allocating the data to one or more groups. The method further comprises displaying one or more non-overlapping symbols on a map to represent the groups. The method further comprises merging the non-overlapping symbols into a lesser number of non-overlapping symbols when the map is zoomed out.

In accordance with another embodiment of the present disclosure, method for visualizing data comprises allocating the data to one or more groups. The method also comprises displaying one or more non-overlapping symbols on a map to represent the groups. The method further comprises splitting the one or more non-overlapping symbols into a greater number of non-overlapping symbols when the map is zoomed in.

In accordance with yet another embodiment of the present disclosure, the method comprises making a decision to merge one or more symbols based at least in part on the distance between the centers of the one or more symbols. The method further comprises splitting the symbols until a pre-set number of symbols is displayed on the map.

Embodiments of the disclosure may provide numerous technical advantages. Some, none, or all embodiments may benefit from the below described advantages. Technical advantages of certain embodiments of the present disclosure include the ability to dynamically update the number of symbols and/or their sizes while the analyst moves around on the map. Other advantages include the ability to represent the density of data represented by a symbol based at least in part on the size and/or shading of the symbol.

Other technical advantages of the present disclosure will be readily apparent to one skilled in the art from the following figures, descriptions, and claims.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
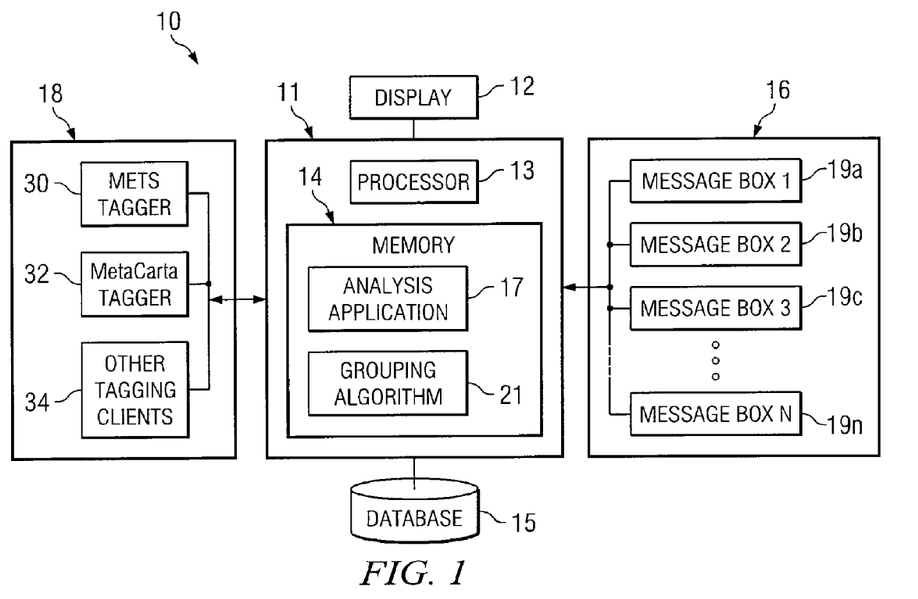
FIG. 1 is a diagram of the components of one embodiment of a system for analyzing intelligence information.

FIG. 1 illustrates one example embodiment of an intelligence analysis system 10. System 10 is a knowledge management and visualization system that focuses on spatial exploitation of intelligence and the presentation of intelligence data to an analyst. Intelligence analysts, working for the Department of Defense, for example, have a need for a system that quickly connects the analyst to intelligence and operational information without prior knowledge of the available information products. System 10 integrates analytical, geospatial, and knowledge management tools to the analysts to aid in their tasks.

As described in greater detail below, intelligence analysis system 10 can comprise a computer system 11 connected to a display 12 and a database 15. The computer system 11 comprises a processor 13 and memory 14 operable to run one or more computer programs 17, which may be stored in memory 14 or another suitable location, that provides intelligence information to an analyst. Computer system 11 also can include a variety of interfaces for connecting to databases, message boxes, and application software systems. System 10 further comprises one or more message input boxes 16, which can provide intelligence information to the analyst. Message Boxes 1, 2, 3, . . . N (19a-19n in FIG. 1) can be populated with intelligence information in a variety of ways. System 10 further comprises a message tagging system 18 used to search messages and other intelligence reports for key words and process the information found for further review by an analyst. One such tagging program is the MetaCarta Tagger 32; another is the Metadata Extraction and Tagging Service 30 (METS). Other Tagging Clients 34 represents other software systems that can be used for a similar purpose. An analyst can use system 10 for a variety of tasks, including data searching, retrieving and displaying data from multiple sources, sharing information with other analysts, tracking forces, providing surveillance and reconnaissance, and creating a full intelligence picture.

Embodiments of system 10 can use database 15 for one or more tasks. First, the database can store analyst configuration information. Each analyst can create a set of profiles that can be stored on the database. A second use is short-term data storage. Data from the various data sources that computer system 11 connects to can be cached while in use. A third possible use of database 15 is lookup tables. One example of a look-up table is a gazetteer, a collection of geographic place names, which an analyst can use in a variety of ways.

One aspect of system 10 is pre-processing messages as they come into the system. Message tagging system 18 can access the messages that come into the message input boxes 16 and search for entities such as people, places, or things in the text. The message tagging clients in the message tagging system 18 can then find and display other intelligence and background information about those entities to the analyst. Another aspect of system 10 is the ability to display and process a variety of maps and geographic information to the analyst. In certain embodiments, system 10 can provide geographic information to the analyst based in part on the map the analyst is viewing at any given time. Yet another aspect of system 10 is the ability to process and group data for display on a map. An analyst may wish to move around a map, or zoom in and out to view the map at a different resolution. System 10 can display data on the map that changes in real-time when the analyst alters the view on the map.

System 10 includes one or more message boxes 19a-19n as shown in FIG. 1. One example of a message box 19 is the Web Intelligence Search Engine (WISE) System. The WISE System is used to store unconfirmed intelligence reports and to perform searches for key words on these reports. Computer system 11 allows analysts to search the WISE System for reports of interest as well as to allow the analysts access to the automatic report aggregation service that WISE provides, called Mail Files. System 11 can connect to WISE, for example, through a web service interface over HTTPS for specific queries. System 11 can also connect to WISE through a sFTP service for mail files.

Another example of a message box 19 is the Distributed Geospatial Intelligence Network (DGINet) system. It allows for easy discovery, fusion, and display of geospatial and geospatial intelligence data from multiple remote organizations via low bandwidth web services. System 11 interfaces with DGInet to retrieve map imagery for display to the user when using the visualization service. System 11 can connect to DGInet over a web service using the HTTPS protocol and retrieve a map image for display in the client applet.

Yet another example of a message box 19 is the Counter Terrorism Analyst Vetted Relational System (CT-AVRS), used to store finished products generated by analysts. System 10 interacts with the CT-AVRS to display vetted information to the analyst. System 11 connects to the CT-AVRS database to query an Individuals table. System 11 is able to take a person's name and search for all known people with that name or alias. These individuals can then be displayed with a Relationship Viewer, which could be located within memory 14 or could be a separate computer program that connects to system 11. In one embodiment, system 11 connects to CT-AVRS using TCP/IP using the Microsoft SQL Server protocol, which establishes a read only database connection.

Figure 2A:
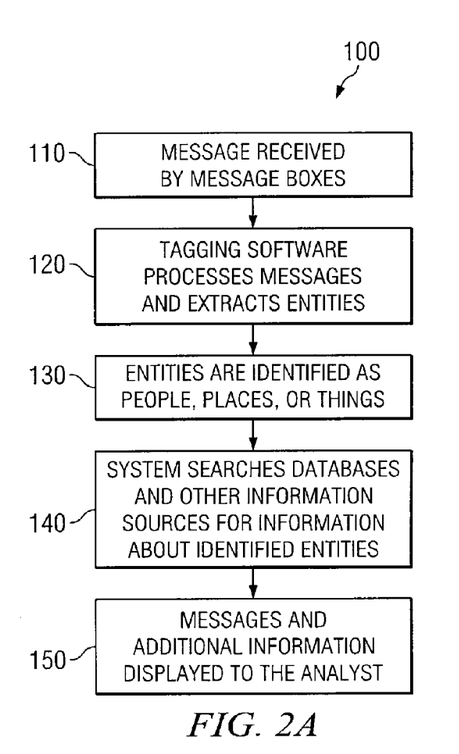
FIG. 2A is a flowchart illustrating one method of processing and presenting intelligence information to an analyst.

FIG. 2A is a flowchart 100 describing how messages received by system 10 are processed by a computer program 17 for further use by the analysts. Program 17 is operable to perform the steps listed in FIG. 2. In step 110, the system receives messages into one or more mailboxes. These boxes are populated in a variety of ways; for example, messages could come from intelligence field agents, military intelligence systems, or news reports. At step 120, the tagging software clients 18 process the messages. The messages are read to determine which people, places, or things are contained within them and how those entities should be processed for providing information to the analyst. The entities are identified in step 130. Here, software programs such as MetaCarta 32 can be used to extract the entities. These programs can also present additional information, or query other resources for additional information about the extracted entity. For example, MetaCarta 32 can extract a place name from the message and display it on a map. ThingFinder, another example tagging client, could locate a date mentioned in the message, and provide a list of events that occurred on or near that date for the analyst to consider. These actions are taken in step 140. Data sources are accessed and searched for information related to the entities extracted from the message. In step 150, the message is displayed to the analyst, and the additional information is also presented in a format that allows the analyst to easily access and further process the information. In certain embodiments, the tagged entities can also be displayed to the user.

Figure 2B:
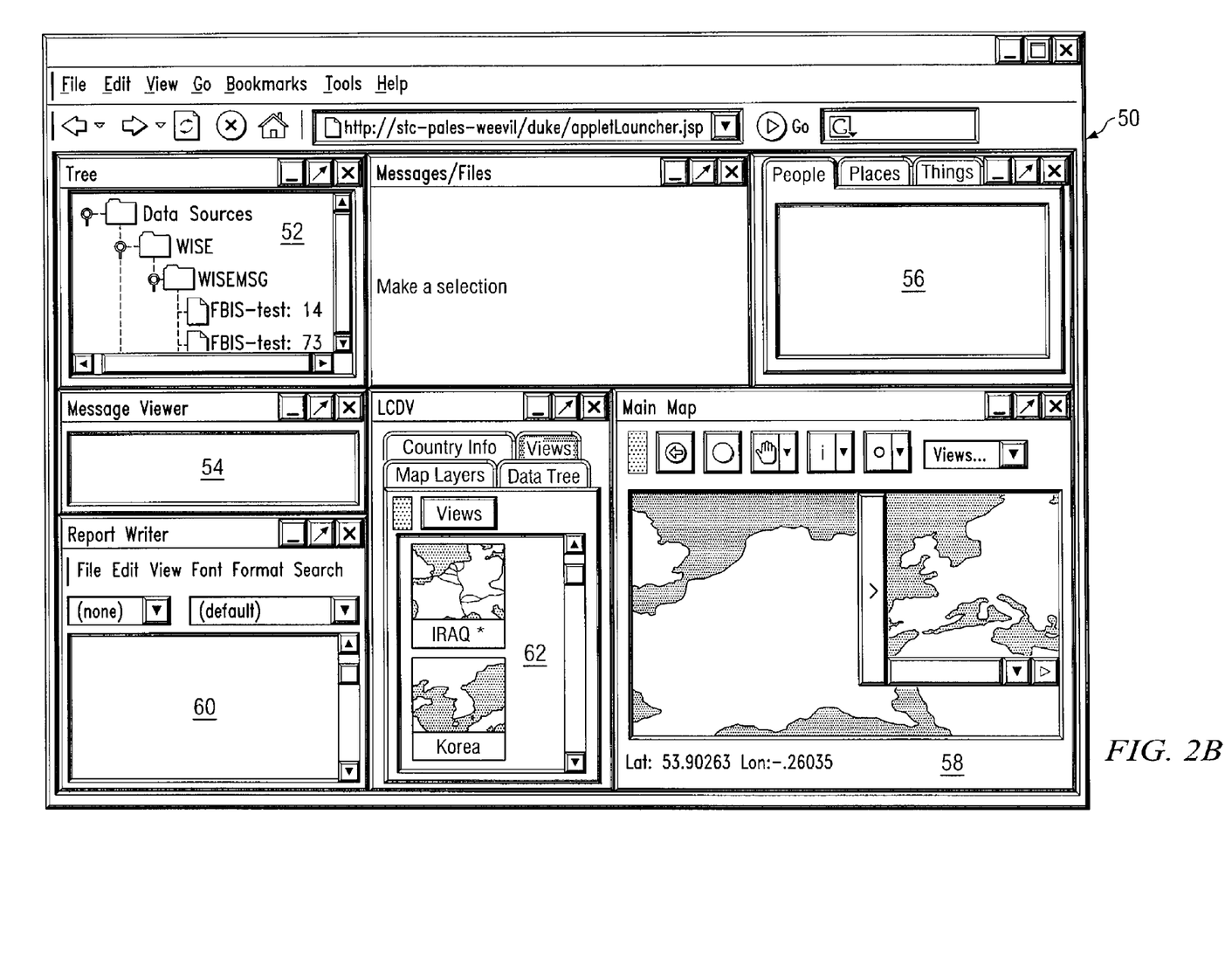
FIG. 2B is one example of a view of the system of FIG. 1 that may be presented to an analyst.

FIG. 2B shows an example view 50 of the display 12 of FIG. 1 that could be used by an analyst. Computer program 17 generates the view 50 on display 12, or any other suitable display. The windows shown in FIG. 2B can be presented in a variety of layouts and still be within the scope of this disclosure. One component of the view 50 is a message window 52 that allows messages to flow in. These message windows can operate similarly to an e-mail inbox, where messages are placed into a box for viewing by the analyst as they come into the system. An analyst can be assigned more than one mailbox to monitor, and the system 10 can provide access to each mailbox in this example view. The messages can include the subject, date, or other information that the analyst can quickly read as the messages come into the system.

In another portion of the view 50, the message can be displayed in the message viewer 54. In this example view, when the analyst selects a message it is displayed in the message viewer 54 below the list of mailboxes, on the middle left side of the view 50. The analyst can scroll through the message here if it is too large to fit entirely within the message viewer 54. The message viewer 54 also allows the analyst to copy information from the message for other uses, such as writing reports.

The intelligence analysis system can also pre-process messages as described above. Entities such as people, places, and things are pulled from the text and more information on them can be displayed to the analyst. These can be shown in window 56 in FIG. 2B. Tabs at the top of window 56 can be used to divide the display into people, places, and things. Multiple smaller windows can be displayed within window 56 as well. The information that will be shown in these windows will be determined in part by the software programs that extract entities from the text.

Suppose a message comes into the system, and within the message the town of Mosul, Iraq, is named. MetaCarta Tagger 30 can be used to scan all messages as they come in, and it can extract the entity "Mosul" from the message and display a map of Mosul and the surrounding area. This map can be displayed under the "Places" tab at the top of window 56. MetaCarta may find multiple place names in a message as well. In that case, the system can display maps of each of the place names under the "Places" tab. The analyst can select between the different using a mouse or arrow keys, or any other suitable method. The map that is selected can be displayed on the main map 58 on the lower right corner of the view 50 in FIG. 2B. A variety of features are included on the main map 58, which will be discussed below.

Tagging software 18, such as MetaCarta 32, and other computer programs that processor 13 can run in memory 14 can do more than find cities that are extracted from a message. Computer programs such as tagging software 18 or computer programs 17 can be used to identify geographical features such as lakes, rivers, mountains, and other formations. The programs can also find locations based on their location relative to other known entities, such as in a message describing a location "20 miles south of Baghdad." Tagging software 18 can also be used, if desired, to show street-level maps when a street address or specific location is mentioned in a message. Also, multiple types of maps of a place can be displayed for the analyst to choose from. The analyst can set various preferences to determine what information is displayed to him and how the system displays it. For example, the analyst may want to see a topographical map along with a population density map whenever a city name is extracted from a message. The analyst can set up his preferences to direct the system 10 to take these actions. An analyst may also want information about, for example, all military facilities near a place extracted from a message. The system can take the place name and run it through other information sources, and provide that new information to the analyst. The analyst can manually request to do this for any given message, or could set up preferences so that certain information is always provided to the analyst without prompting.

The various extraction software programs that can be used in the system 10 can also be configured to extract people mentioned in the incoming messages. More information on these people can be displayed in the "People" tab in the window 56 of FIG. 2B. For example, a message may come in with information about a person. The extraction software can tag the name of the person in the message and begin a search of data sources to find more information about that person. For example, a picture of the person may be available. That picture can be displayed in the "People" tab in window 56. Other information may also be available, and can be displayed to the user. This can also appear in the window 56, or the analyst may have to request further information, for example by clicking on the picture of the person. The database sources may have information on the person's last known whereabouts, affiliations with groups or other people, criminal history, or other types of information. In some embodiments, people can be marked with an icon to note their affiliation or other information about them. The analyst can then determine information about the person by just noting the icon that accompanies the person.

The tagging software 18 can also extract entities from the text of the incoming messages that are not people or places; we can refer to these as "Things." One example of a "thing" that can be extracted is a date. The intelligence analysis system 10 can take a number of actions when a date is found in the message. For example, the system could show a list of other events that happened on or near that date. It could also locate individuals that have a history relating to that date, and display links to more information about those individuals. The system could also find other documents that reference that date.

In the lower right window of FIG. 2B more information about the people, places, or things that have been tagged can be displayed. For example, if the analyst wants to see a larger version of a map of a place identified in one of the messages, he can direct the system to display that in window 58. This map can show more detail than the map in the Places tab above it. The map in this view can also comprise more information than a smaller map. For example, system 10 can embed information from various data sources and databases onto this map in the shape of icons. The analyst could click on the icon to pull up additional information. The analyst could also zoom in and out on the map, which could also trigger different types of additional information being displayed. Analysts can also move around the map to view a different location.

Window 58 can also switch between larger displays of the maps shown in the Places tab above it. For example, the Places tab may show three maps that it extracted from a message the analyst is looking at; a map of Iraq, a map of California, and a map of Dubai. The analyst can select the map of Iraq in the Places tab, and that map will then be displayed in the larger window, window 58. The map in the larger window could have icons on it representing, for example, troop locations in Iraq. The analyst could select these icons for more information on the troops in those locations, or could zoom in on the map to receive additional information pulled from a variety of databases connected to the system 10. Later, the analyst may want to view the map of Dubai. He can select the map of Dubai in the Places tab, and then that map will be the active map in the window 58. Again, that map could show troop locations or other information that the analyst wants to see there. The analyst can manipulate that map in the same way he can manipulate the Iraq map. At any time the analyst can switch back to the Iraq map, or to the map of the third location extracted from the message, the map of California. The California map may show different types of information than either the Dubai or the Iraq map. The analyst may not want military information to be displayed when he is looking at a map of a location in the United States, for example. The analyst can continue to use the maps in this manner until he selects new message, and the system processes the entities in that message.

The lower left corner of FIG. 2B contains a report writer 60. The report writer 60 is a section of the view 50 that the analyst can use to create a report for further analysis and review. The report writer 60 allows the writer to copy and paste text from messages or other information sources to create a custom report. The analyst can also take screen shots of maps and place those in the report writer 60. The report writer can also incorporate the features of text editing programs like Word-Perfect and Microsoft Word, so that analyst can create reports similar to what can be created with those types of programs.

View 50 of FIG. 2B also includes a window 62 that we can call the bookshelf. The bookshelf 62 provides the analyst access to references material related to what he is viewing on the main map in window 58.

Figure 3A:
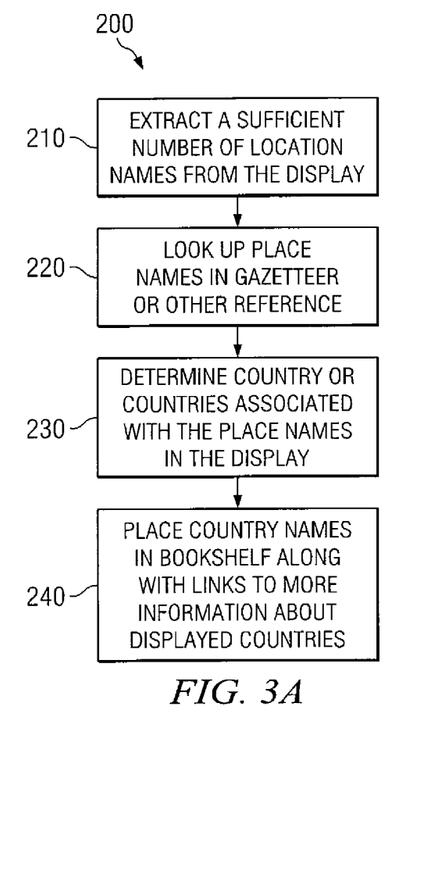
FIG. 3A is a flowchart illustrating one method of presenting geographic information to an analyst.

FIG. 3A is a flowchart describing how country information is placed into the bookshelf 62. In step 210, computer program 17 analyzes a map on the display 12, and a number of location names are extracted from the map. The number of names extracted needs to be large enough so that the software can accurately identify the area displayed on the map. However, taking too many names than are necessary to identify the country may slow the speed of processing. In step 220, computer program 17 looks up the names extracted in a gazetteer or other reference. For example, if the program 17 extracts the names of five cities and two rivers, the gazetteer can determine which country those cities and rivers are located in. That information is used in step 230 to determine which country or countries is shown on the display. If the number of names extracted initially is insufficient to accurately determine the countries displayed, the program 17 can extract more names from the display and continue searching the gazetteer until the countries displayed can be determined with a sufficiently high level of certainty. In step 240, the system 11 takes the names of the identified countries and places those in the bookshelf, along with links to more information about the displayed countries. The analyst then has this information readily available while viewing the map.

Figure 3B:
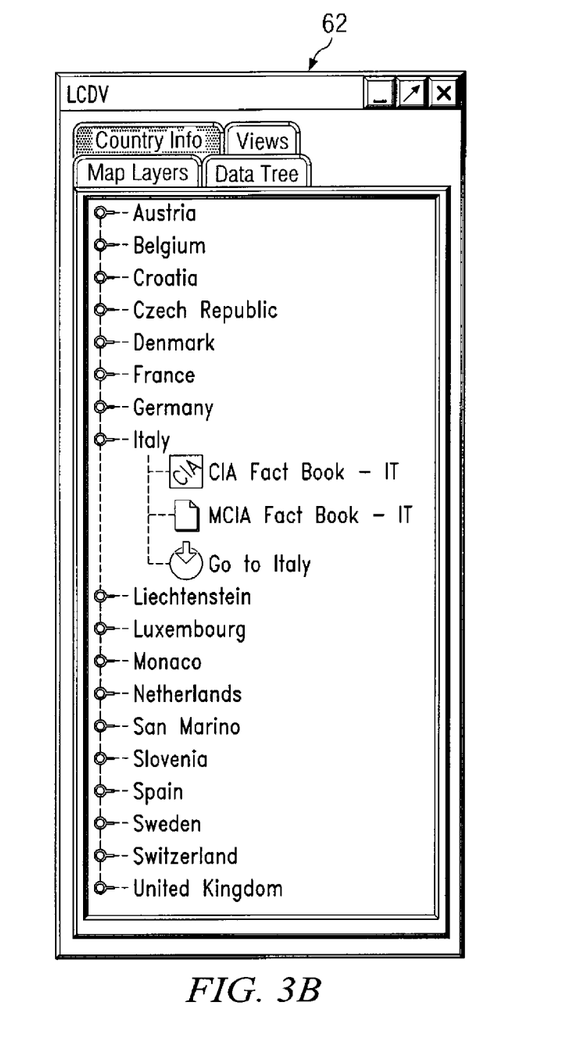
FIG. 3B is one example of a component of FIG. 2B used for presenting geographic information to an analyst.

Another view of the bookshelf 62 is shown in FIG. 3B. Bookshelf 62 is generated by computer program 17 and displayed on display 12. As seen in FIG. 3B, the "Country Info" tab shows a list of countries. At any given time, these are the countries that are displayed on the main map. In this example, the map is displaying a portion of Europe, so many of the countries are visible on the map, and are therefore listed in the bookshelf 62. As the analyst moves around the map or zooms in or out, this list of countries dynamically updates to list only the countries that are currently displayed on the map. In the bookshelf 62, the analyst can select a country and the system provides access to more information about that country from various sources. In FIG. 3B, Italy is selected, and the CIA Fact Book is listed as a source of information on Italy. Other sources of information could be listed here as well. The analyst can select one of these information sources to access the information inside it.

The information sources located within the bookshelf 62 are generally bits of information that are geographic in nature, yet not easily displayed on a map. Placing this data in the bookshelf gives the analyst a more organized way to see that data in the context of the map. For example, an analyst may want to know the religious breakdown of a country displayed on the map. It would be awkward to display this information on the map; some possible ways to do that would be with a pie chart showing the breakdown of various religions, or different icons representing the various religions scattered across the map. Displaying the information on a map in this manner does not provide any new insight into the information for the analyst. The analyst just needs to know the numbers for a particular country. In that case, the information can instead be found within a menu on the bookshelf 62. The analyst can find that information when he needs it, and it does not clutter the map with extraneous figures or icons. As another example, the analyst may want to know the gross domestic product of a particular country. Since this value represents the country as a whole, placing it at a particular latitude/longitude point within the country on the map does not provide any extra meaning for the analyst. Contrast this to the location of military facilities, which can be mapped to a particular latitude/longitude, and for which geographical location could be a critical piece of knowledge for the analyst. Gross domestic product could instead be placed on the bookshelf 62, where the analyst can pull it up if necessary, while keeping the map area free for location-specific information.

Also seen in FIG. 3B, under a particular country name is a "Go to" link; in this example, it says "Go to Italy." The analyst can select that link and the main map will zoom to the borders of that country. This provides an easy way for the analyst to navigate to a zoomed-in view of a country without having to manually move around the map. It also allows the analyst to go back to viewing a country quickly if he has moved away from it while navigating around the map.

Another method of determining which countries are displayed on the map is reading the latitude and longitude coordinates found in the map and using those to determine which countries are being displayed. One way to do this is to determine the latitude/longitude of the four corners of the display, and then use a gazetteer or other geographical database to determine the countries being displayed on the map.

One feature of the intelligence analysis system 10 is the dynamic display of location-specific information. An analyst, for example, may want to know the specific location of all United States Armed Forces in Iraq. The system 10 can display this information graphically on a map for the analyst. More specifically, the system can use a grouping algorithm as a way to take data from any set of sources, with any attributes, and visualize it graphically. The system can take data of similar type and combine them into a single group with a visual representation. This puts a single icon on the display, and then draws an area around that icon where that data exists. The grouping algorithm 21 can be a component of computer program 17, or could be stored separately in memory 14. Processor 13 can run the grouping algorithm 21. It could also run in a separate program that is accessed by system 11. The results of the grouping algorithm 21 can be displayed to the analyst on display 12.

Figure 4A:
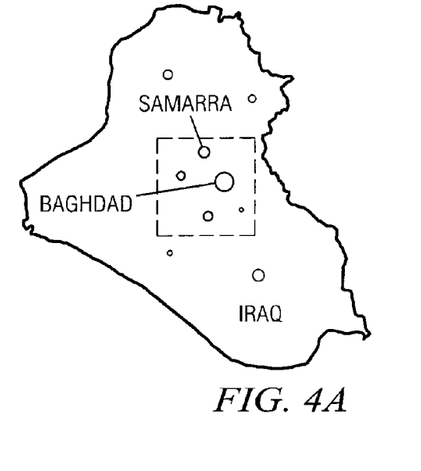
FIGS. 4A and 4B are examples of maps that demonstrate the results of a grouping algorithm.
Figure 4B:
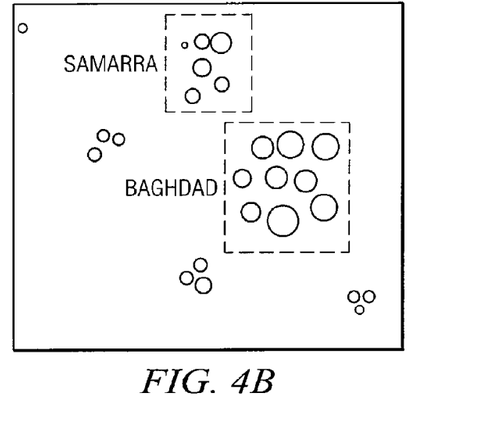

FIGS. 4A and 4B will be used to illustrate the grouping concept. FIG. 4A is a diagram of the country of Iraq, with dots representing one or more groups on the map. FIG. 4B is an expanded view of the dotted section in FIG. 4A. For example, the dots can be used on a map of Iraq to represent the location of US troops. The dots can vary by size or shading to represent different densities of troops. In FIG. 4A, the size of the dots is correlated with the number of troops in that area. The largest dot on the map represents Baghdad, and the large number of troops stationed there. The other dots may represent other cities or US military installations in Iraq. The analyst may want to zoom in on the map to a particular location, and get a more accurate picture of where the troops are stationed. When the analyst zooms in, the dots still within the view will break apart into smaller dots, to more accurately represent the location of troops. The algorithm 21 does not allow the circles in any given view to overlap. The algorithm 21, described below, will determine when the circles should be combined and when they should be split. The circles could also be shaded to show density; in that case, they may not be different sizes but they would be different shades of a particular color, with the darker colors representing a higher density of US troops.

FIG. 4B shows a zoomed-in view of the dotted square shown in FIG. 4A. The analyst has decided he wants to see a more detailed representation of troop locations in this area, so he has zoomed in so that he is viewing solely the interior of the dotted square of FIG. 4A. In FIG. 4B, the larger circles from FIG. 4A have been broken into smaller discrete circles to more accurately show the locations of troops. The largest circle that represented Baghdad in FIG. 4A is now broken into nine discrete smaller circles in FIG. 4B. The other circles are broken into smaller circles as well. If the analyst zoomed in again to view only Baghdad, the nine smaller circles representing Baghdad would be broken into even more smaller circles, spread across Baghdad to represent the locations of the troops. The splitting and merging of the circles is controlled by the grouping algorithm 21.

Figure 5A:
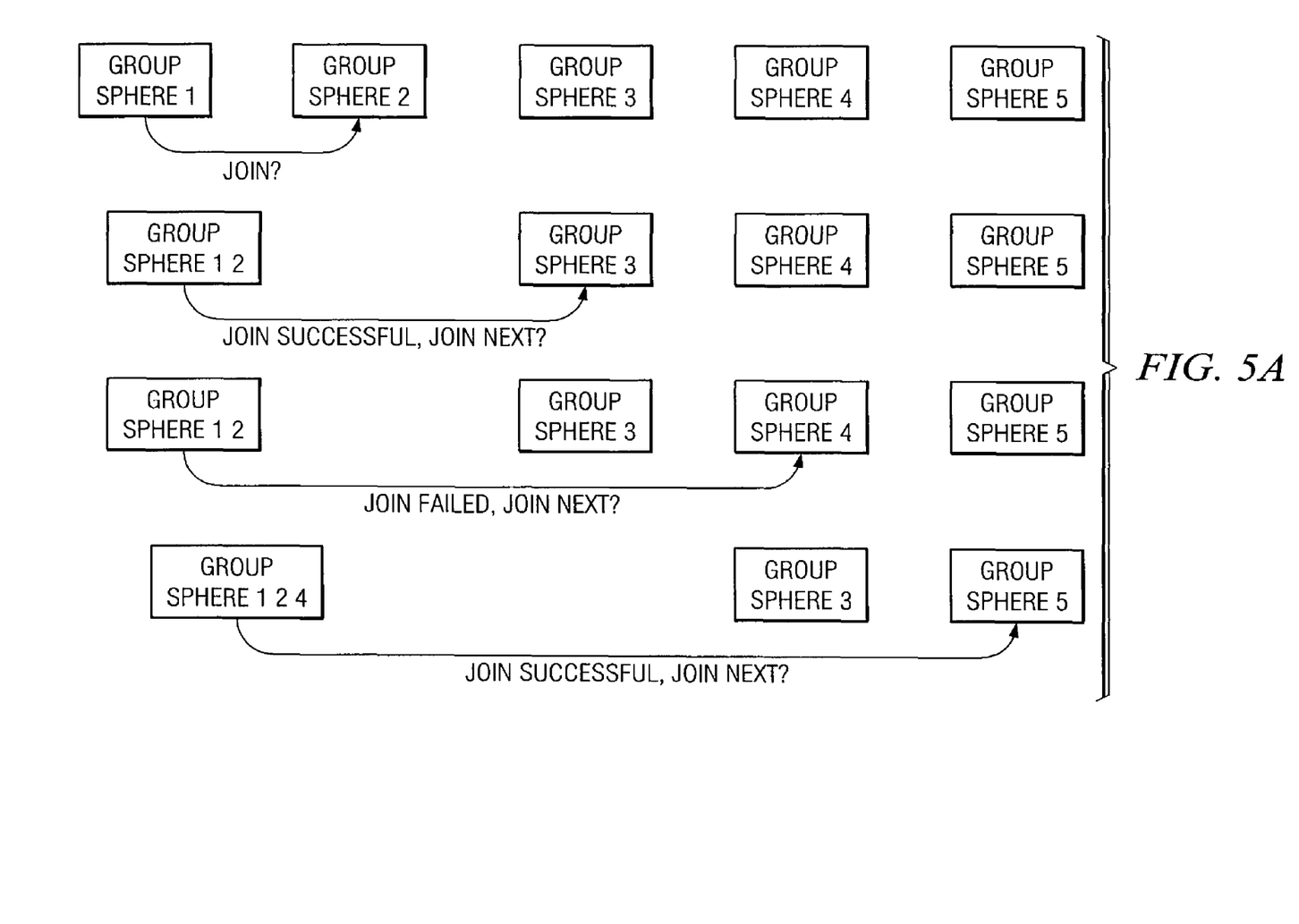
FIG. 5 is a graphical representation of the grouping algorithm used to group elements as shown in FIGS. 4A and 4B.
Figure 5B:
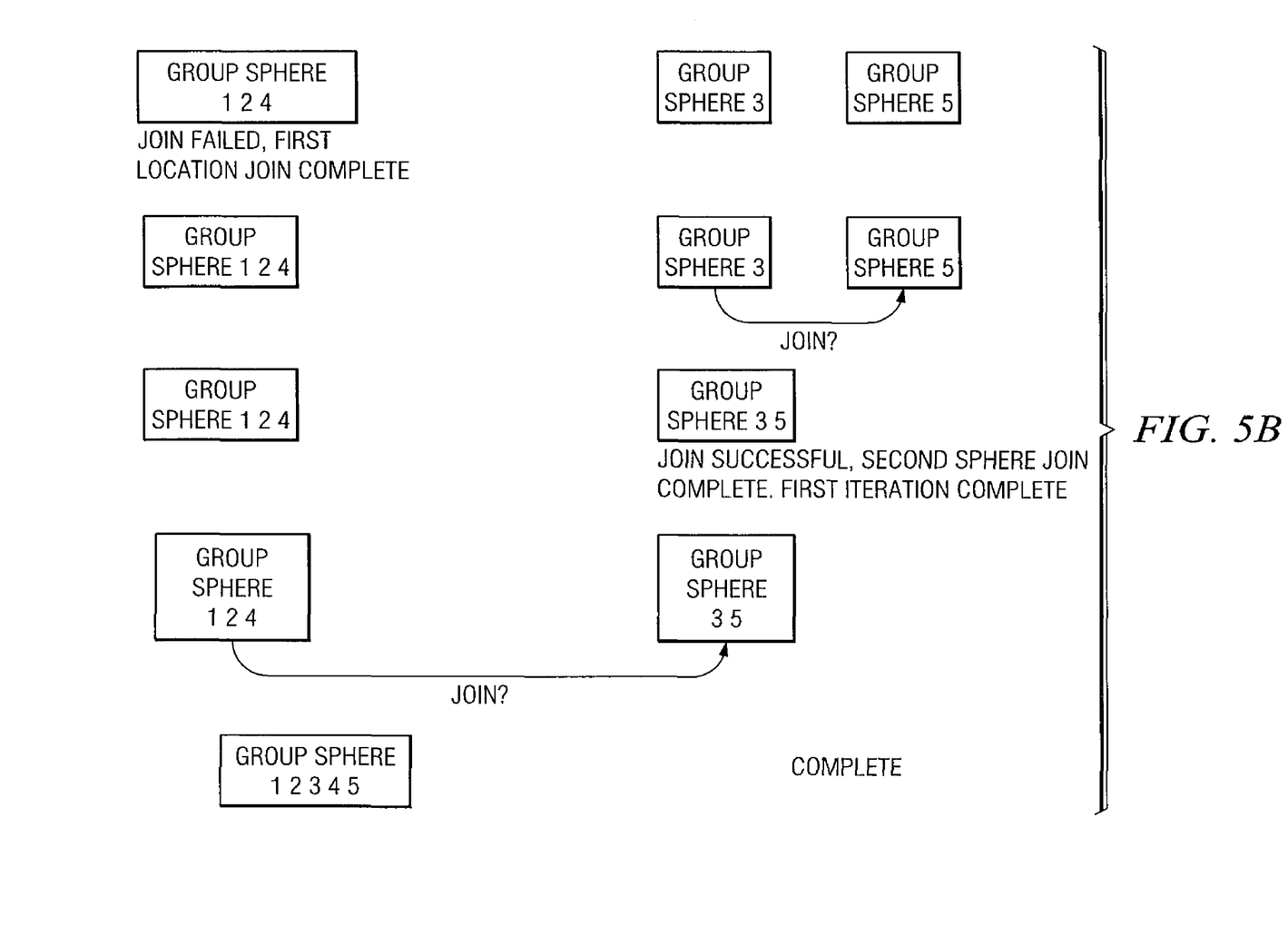

FIGS. 5A and 5B show a graphical representation of the grouping algorithm 21. Briefly, the algorithm 21 chooses one sphere (or circles) and looks at the rest of the spheres individually to see if they can be joined. Once all spheres have been considered, the algorithm 21 looks at the rejected spheres to see if they can be joined with each other. Then, the algorithm 21 compares the remaining joined groups to see if any of those can be joined. This continues until a set number of remaining spheres is reached, or until no more joins can be performed. FIGS. 5A and 5B show an example set of five groups that are joined into one group by the algorithm 21.

As an example, the algorithm 21 begins with a list of groupable objects, such as troop regiments. The number of objects we want to display is set externally, by the analyst or by the designer of the intelligence analysis system 10. The initial distance between the objects, the step distance, and the maximum distance are also pre-determined. When the number of nodes is greater than the number that we want to display, the algorithm 21 is performed in order to merge objects and reduce their number down to the limit. The objects will be tested one at a time, and if they are close enough together they will be joined. To determine this, the algorithm 21 checks to see if the centers of the objects are within the allowable distance from each other. If none are close enough to be joined, the distance is incremented by the step distance, and the objects are tested again to see if they are close enough to be joined. This continues until the objects are merged together and the number of desired nodes is reached, or until the distance is incremented so that it reaches the maximum distance. If the maximum distance is reached, the grouping algorithm 21 will not be continued and the objects will not be merged down to the specified number.

Figure 6:
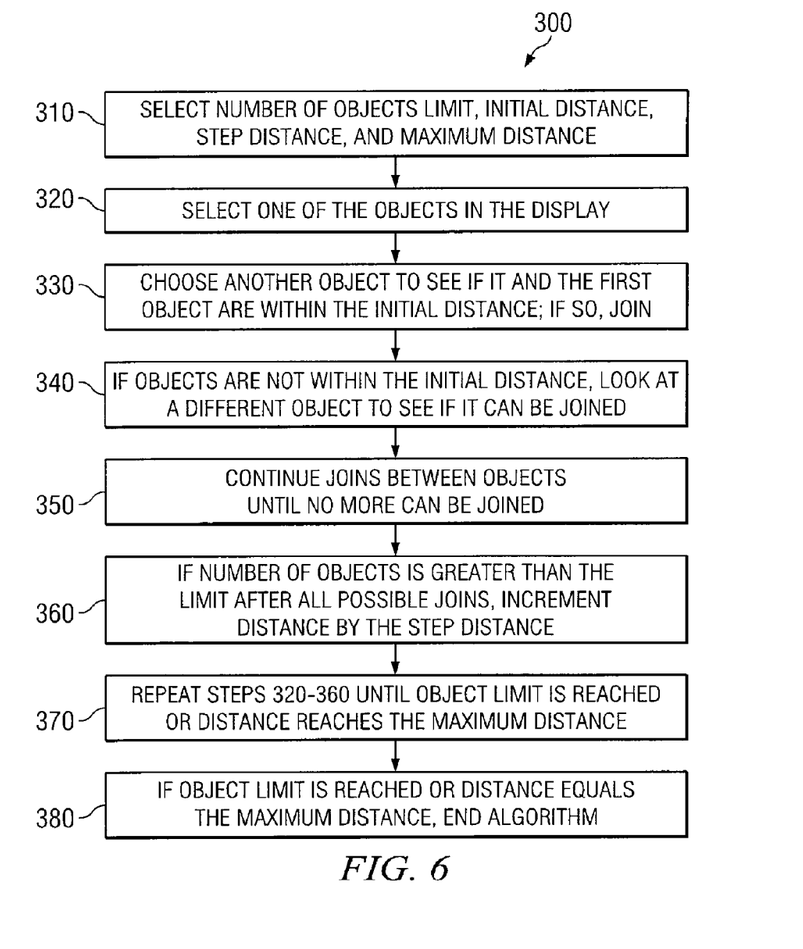
FIG. 6 is a flowchart illustrating one method of grouping data according to the grouping algorithm described in FIG. 5.

FIG. 6 is a flowchart describing the grouping algorithm 21, which can be stored in memory 14 and run by processor 13. In step 310, a developer or analyst can select the number of objects that he wants displayed on the map at a given time. The initial join distance can also be chosen; that is, the distance between objects that will be used for the first iteration of joins. The step distance is also set. That distance is the amount that the join distance is incremented after an iteration of join attempts has been completed. Selected next is the max distance, which is used to tell the software that objects at that distance or further should not be joined. The algorithm 21 chooses two of the objects in the display and checks the distance between them; if they are within the initial distance, they are joined. Steps 320 and 330 illustrate this. If the objects are not within the join distance, one of the previous two is tested for a join with a different object, as described in step 340. The process then continues like this in step 350, testing pairs of objects to see if they can be joined, until no more joins are possible. At step 360, the algorithm 21 checks to see if the number of objects remaining is greater than the limit. If so, the algorithm 21 increments the distance by the step distance and the objects are tested again to see if they can be joined. This continues until the object limit is reached, or until the distance reaches the maximum distance. At that point, the algorithm 21 ends and the objects can be displayed on the map.

As an example, consider an analyst that wants to see the locations of all US aircraft in Baghdad and the surrounding area. The system could show him a large map of Baghdad with an object on the map representing each individual aircraft. However, this may be unwieldy to use, or may not be useful for this particular analyst. The analyst decides that he only wants to see ten objects or less in Baghdad representing US aircraft. These objects will show up as circles of varying size on the map, their size determined by the number of aircraft within the boundaries of that circle. The analyst can set the objects limit at ten. The analyst may then decide that the initial join distance should be four miles. That is, the center of any object representing an aircraft within four miles of the center of another object should be joined with that other object, with the resulting object on the map being an appropriate size to represent the number of aircraft within its boundaries.

Once this is done, for example, the analyst may have a map of Baghdad that shows fifteen objects of varying sizes that represent the location of US aircraft. None of the objects are within the initial distance of four miles, so no more joins can be performed. Now the analyst can increment the distance by the step distance, which could be, for example, one mile. The algorithm increases the join distance to five mile from four miles, and checks the objects again to see if any can be joined. The process employed here is similar to the one shown in FIGS. 5A and 5B. The various possible join scenarios are tested, and joins are performed until no more objects are within the new join distance of five miles. This iteration of joins might leave the analyst with nine objects on the map, in which case the algorithm is complete because the system has reached the objects limit.

If there are still more than ten objects, the join distance is incremented again by the step distance, from five miles to six miles. Joins are again performed until none are within the join distance, or until the algorithm reaches the object limit. The analyst may have decided that the maximum distance for this scenario is eight miles. That is, on the map he does not want objects further apart than eight miles to ever be joined. Once the join distance reaches the max distance, no more joins are performed on the objects.

This join algorithm as depicted in FIG. 6 can be performed in real-time while the analyst moves around a map. The join distance, step distance, and max distance can be a function of the resolution of the map. That is, if the analyst is zoomed out and viewing a large area on the map, the join distance may be very large. If the analyst decides to zoom in on the map, the join distance could then become smaller so that large objects are broken up into smaller objects; this way, the analyst can see a more accurate representation of where object are actually located when he zooms in. This can be seen in FIG. 4B, where the zoomed-in view of Baghdad shows a larger number of smaller objects than the view in FIG. 4A of the country as a whole.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for visualizing data, comprising
allocating, by a computer system, data to one or more groups;
displaying, by the computer system, one or more non-overlapping symbols to represent groups on a map;
merging, by the computer system, the one or more non-overlapping symbols into a lesser number of non-overlapping symbols when the map is zoomed out;
splitting, by the computer system, the one or more non-overlapping symbols into a greater number of non-overlapping symbols when the map is zoomed in; and
preventing for any view of the map, by the computer system, the one or more non-overlapping symbols from overlapping.

2. The method of claim 1, wherein merging the one or more non-overlapping symbols comprises merging two symbols into one symbol based on their proximity to one another.

3. The method of claim 1, wherein splitting the one or more non-overlapping symbols comprises creating two or more non-overlapping symbols.

4. The method of claim 2, wherein the decision to merge symbols is based at least in part on the distance between the centers of the two symbols.

5. The method of claim 1, wherein symbols are merged until a pre-set number of symbols is displayed on the map.

6. The method of claim 1, wherein the symbols are split until a pre-set of number of symbols is displayed on the map.

7. The method of claim 1, wherein different symbols are used to represent different groups on the map.

8. The method of claim 1, the density of data within a group is based at least in part on shading of the symbol.

9. The method of claim 1, wherein the density of data within a group is based at least in part on the size of the symbol.

10. An apparatus comprising:
- an electronic display operable to display one or more non-overlapping symbols to represent one or more groups on a map; and
- a processor operable to:
  - allocate data to the one or more groups;
  - merge the one or more non-overlapping symbols into a lesser number of non-overlapping symbols when the map is zoomed out;
  - split the one or more non-overlapping symbols into a greater number of non-overlapping symbols when the map is zoomed in; and
  - prevent, for any view of the map, the one or more non-overlapping symbols from overlapping.

11. The apparatus of claim 10, wherein the processor is further operable to merge two of the non-overlapping symbols into one symbol based at least in part on their proximity to one another.

12. The apparatus of claim 10, wherein the processor is further operable to merge the symbols until a pre-set number of symbols is displayed on the map.

13. The apparatus of claim 10, wherein different symbols are used to represent different groups on the map.

14. The apparatus of claim 10, wherein the processor is further operable to vary the size of the non-overlapping symbols to represent the density of data within the group.

15. Logic embodied on a non-transitory computer-readable medium, the logic operable to:
- allocate data to one or more groups;
- display one or more non-overlapping symbols to represent groups on a map;
- merge the one or more non-overlapping symbols into a lesser number of non-overlapping symbols when the map is zoomed out;
- split the one or more non-overlapping symbols into a greater number of non-overlapping symbols when the map is zoomed in; and
- prevent, for any view of the map, the one or more non-overlapping symbols from overlapping.

16. The logic of claim 15, the logic further operable to merge two symbols into one symbol based on their proximity to one another.

17. The logic of claim 16, the logic further operable to merge symbols based at least in part on the distance between the centers of the two symbols.

18. The logic of claim 15, the logic further operable to use different symbols to display different groups on the map.

19. The logic of claim 15, the logic further operable to vary the shading of the one or more overlapping symbols to represent the density of data within the group.

20. The logic of claim 15, the logic further operable to vary the size of the one or more overlapping symbols to represent the density of data within the group.

* * * * *

UNITED STATES PATENT AND TRADEMARK OFFICE
CERTIFICATE OF CORRECTION

| | | |
|---|---|---|
| PATENT NO. | : 7,889,888 B2 | Page 1 of 1 |
| APPLICATION NO. | : 11/769574 | |
| DATED | : February 15, 2011 | |
| INVENTOR(S) | : Thomas P. Deardorff et al. | |

It is certified that error appears in the above-identified patent and that said Letters Patent is hereby corrected as shown below:

Column 1:
Before the "TECHNICAL FIELD OF THE INVENTION" section, at Line 3, insert
-- GOVERNMENT INTEREST
      This invention was made with Government support under contract number GS23F0263K/HHM402-06-F-0374 awarded by the Department of Defense. The Government has certain rights in this invention. --.

Signed and Sealed this
Ninth Day of August, 2011

David J. Kappos
*Director of the United States Patent and Trademark Office*